Sept. 12, 1967     K. G. ANDERSON ET AL     3,340,670
SHRINK PACKAGING APPARATUS
Filed Feb. 15, 1965     3 Sheets-Sheet 1
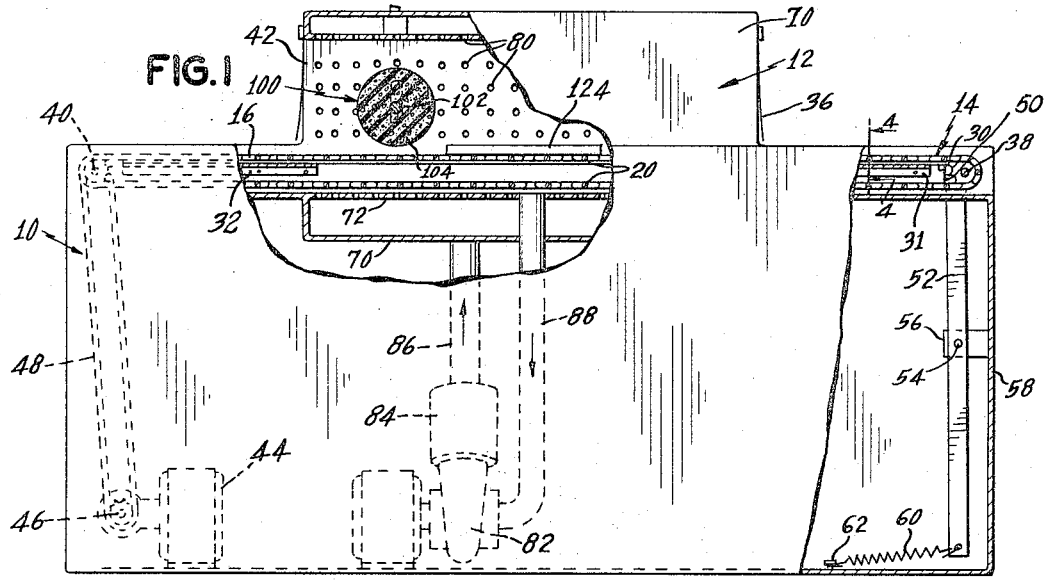
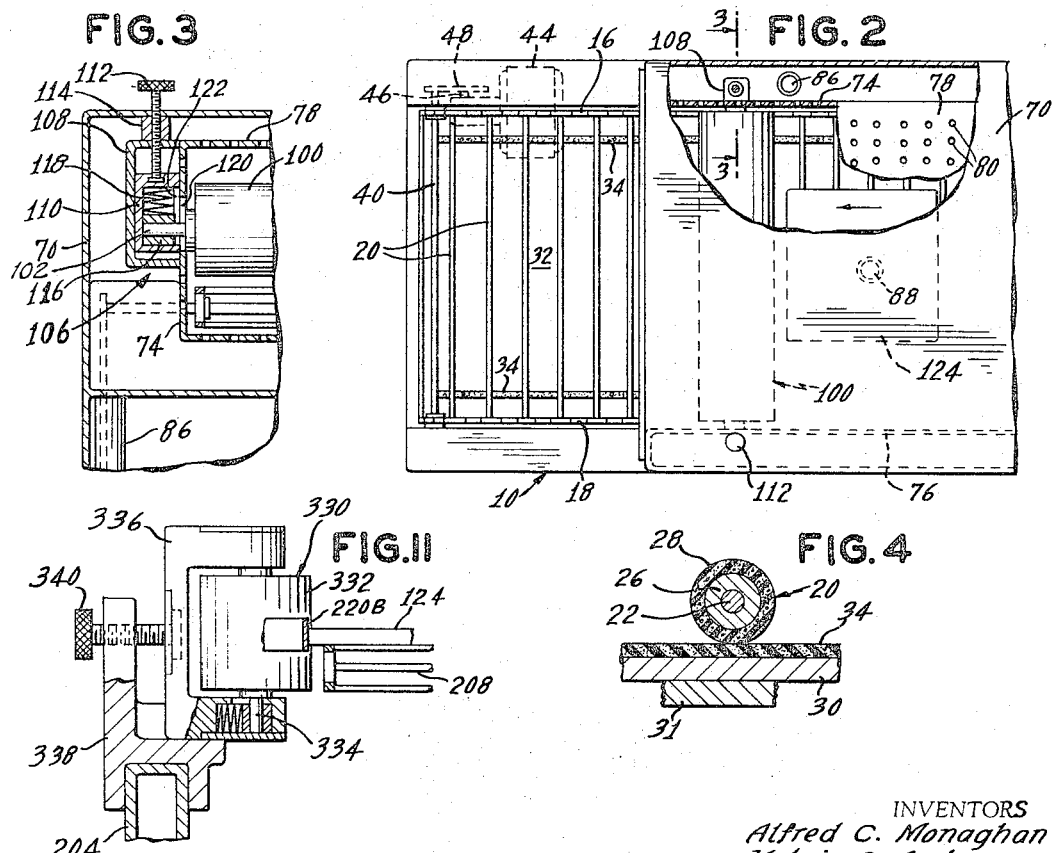
INVENTORS
Alfred C. Monaghan
Kelvin G. Anderson
BY
ATTORNEY INVENTORS
Alfred C. Monaghan
Kelvin G. Anderson

ATTORNEY

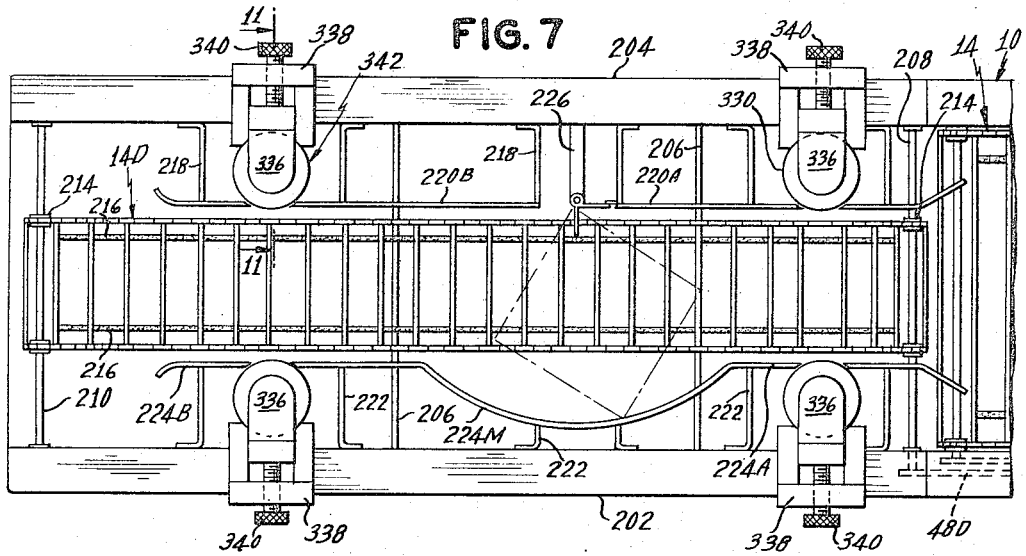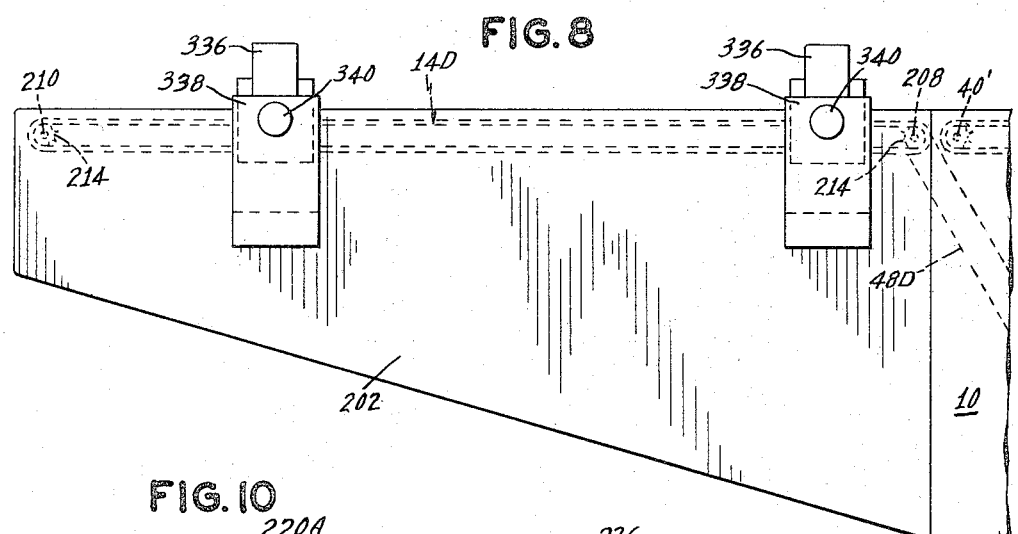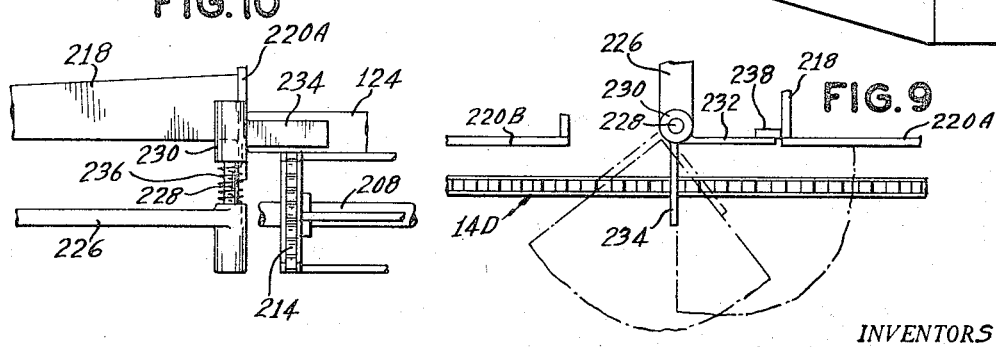

United States Patent Office 3,340,670
Patented Sept. 12, 1967

3,340,670
SHRINK PACKAGING APPARATUS
Kelvin G. Anderson, Westfield, and Alfred C. Monaghan, Warren Township, Plainfield, N.J., assignors to Weldotron Corporation, Newark, N.J., a corporation of New Jersey
Filed Feb. 15, 1965, Ser. No. 432,732
6 Claims. (Cl. 53—30)

ABSTRACT OF THE DISCLOSURE

An apparatus for processing heat shrinkable film wrappers on packages includes a heating chamber for initially heating and partially shrinking the film wrapper, and a resiliently surfaced, heated roller, to bear against and engage the film on a surface of the package, whereby the package drives the roller at a common surface speed, while the roller, progressively and substantially uniformly applies heat and pressure to the film to smoothly, fully shrink the film on the surface. Additional rollers may be provided for additional surfaces.

---

This invention relates to the shrinking of heat-shrinkable thermoplastic films on packages.

When conventional hot air shrink tunnels are utilized to shrink a heat-shrinkable film wrapped about a package, the appearance of the shrunk film is frequently marred by the presence of small wrinkles in the film at the corners and along the edges of the package. This condition is particularly noticeable on thin packages, such as phonograph records.

An object of this invention, therefore, is to provide a method and an apparatus to eliminate completely such wrinkles in the shrunk film.

A feature of this invention is the provision of a resiliently surfaced, heated smoothing roller, to bear against the surface of the partially shrunk film and the underlying package and to rotate therewith at the same surface speed.

The above and other objects, features and advantages of the invention will be fully understood from the following description considered in conjunction with the accompanying illustrative drawings, in which:

FIG. 1 is a view in elevation and partial cross-section of a first embodiment of this invention employing a single smoothing roller;

FIG. 2 is a partial view in plan and partial cross-section of the apparatus of FIG. 1;

FIG. 3 is a detail view in elevation and cross-section taken along the plane 3—3 of FIG. 2;

FIG. 4 is a detail view in elevation and cross-section of an article conveying roller and means for causing this roller to rotate;

FIG. 7 is a view in plan of an additional apparatus for smoothing both pairs of edges of a thin package;

FIG. 8 is a view in elevation of the apparatus of FIG. 7;

FIG. 9 is a detail view in plan of the apparatus of FIG. 7 of the mechanism for rotating the package 90° in the horizontal plane;

FIG. 10 is a detail view in elevation of the mechanism of FIG. 9;

FIG. 11 is a detail view in elevation and partial cross-section along the plane 11—11 of FIG. 7.

Figure 5:
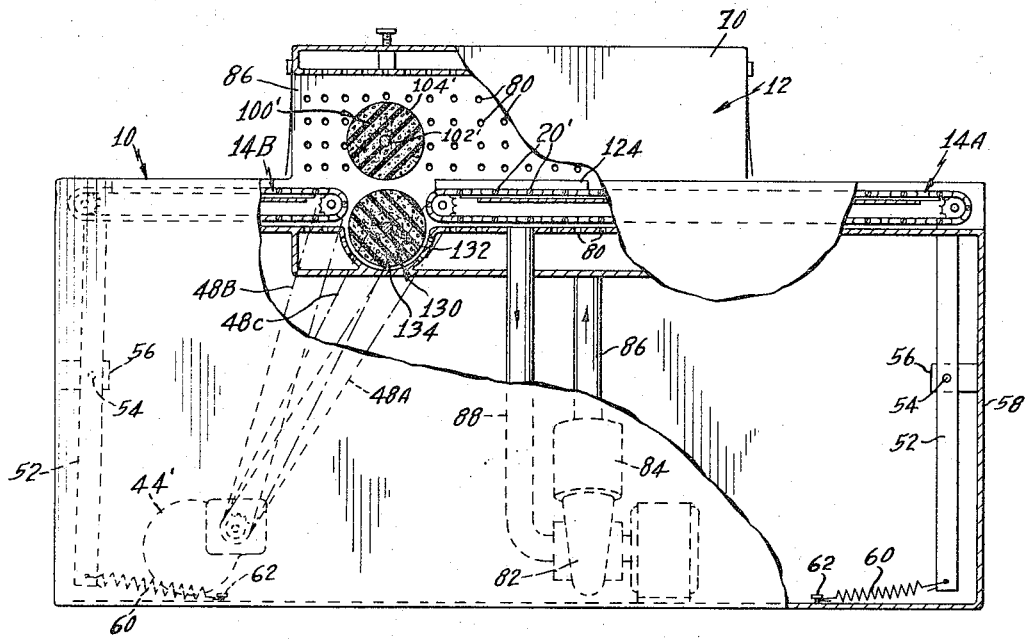
FIG. 5 is a view in elevation and partial cross-section of a second embodiment of this invention employing a pair of smoothing rollers.

Referring to FIGS. 1 through 4, the first embodiment of this invention includes a housing 10, a heating chamber or tunnel 12, and an endless conveyor 14 for moving wrapped packages seriatim through the tunnel for the heat-shrinking of the heat-shrinkable film wrapped thereon.

The conveyor 14 includes a pair of spaced apart, parallel, endless, sprocket chains 16 and 18, and a plurality of package supporting, laterally spaced apart rollers 20 connected therebetween. The chains 16 and 18 are of the hollow pin type and, as shown in FIG. 4, each roller 20 includes a steel rod 22 which is mounted at its ends through the transversely aligned hollow pins of the transmission chains and held in place by suitable fasteners, not shown, such as C rings. Further details of these chains may be found in U.S. patent application Ser. No. 324,485 by Seymour Zelnick, filed Nov. 18, 1963, and assigned to a common assignee. A seamless steel tube 26 is journaled on each rod 22 and each tube 26 has an outer sleeve 28 made of a suitable heat resistant material, for example, a composition of fiberglass and silicone rubber, which also prevents adhesion of the thermoplastic film to the rollers, as might otherwise occur at the elevated temperatures at which the film shrinking operation is performed.

The rollers in the upper run of the conveyor 14 engage and are supported by laterally spaced apart steel bars 30 which extend longitudinally of the apparatus and are supported by the upper horizontal walls or brackets 31 and 32 of the housing 10 as shown in detail in Ser. No. 324,485, supra. A layer 34 of silicone rubber and fiber glass composition is secured to the upper surface of each of said bars 30 to provide a frictional engagement between the rollers 20 and the bars 30. Thus, when the rollers 20 move longitudinally over the bars 30 during the movement of the conveyor chains 16 and 18 through the heating tunnel 12, the rollers 20 are rotated about their own axes and advance the packages supported thereon transversely with respect to these rollers, so that the film on the lower surface of the package is exposed over its entire area to the hot air which flows through the heating tunnel.

The brackets 31 and 32 which support the bars 30 are positioned horizontally in the space between the upper and lower runs of the chains 16 and 18, and extend between and are secured to the opposite sidewalls of the housing 10. The bracket 31 extends lengthwise from a point near the entry end 36 of the heating tunnel to a point near but short of the sprocket chain shaft 38. The bracket 32 extends from a point near to but clear of a sprocket chain drive shaft 40 to a point near the exit end 42 of the tunnel 12. The sprocket wheel drive shaft 40 is positively driven by a motor 44 which has a sprocket wheel shaft 46 of a speed reduction gearing connected to the sprocket wheel of the drive shaft 40 by a sprocket chain 48. The shaft 38 is mounted in a pair of bearings 50, which are each respectively carried by a self-adjusting support 52. One of these supports is positioned near one sidewall of the housing, and the other support is positioned near the opposite sidewall of the housing. The supports 52 are pivotally mounted on a cross-rod 54, the opposite ends of which are each secured in a companion bracket 56 secured to the end wall 58 of the housing 10. A tension spring 60 is secured at one end thereof to the lower end portion of the shaft support 52 and at its other end to a stud 62 which is fixed to the bottom of the housing 10.

The heating chamber 12 is disposed within an outer casing 70 which surrounds and is spaced from a bottom wall 72, two opposite sidewalls 74 and 76, and the topwall 78, thereby forming an air distribution chamber; the walls 72, 74, 76 and 78 of the heating chamber having a plurality of holes 80 therein for the passage of air into the chamber from the outer casing 70. An air blower 82 is connected to an inlet of an electrical heater 84, which has an outlet tube 86 which is connected to the lower part of the casing 70 so that electrically heated air is supplied under pressure to the heating tunnel 12. The bottom of the tunnel is connected by a tube 88 to the inlet end of the blower 82 for the recirculation of the heated air from the tunnel 12 to the heater 84 and thence to the distribution chamber 70.

A roller 100 having a shaft 102 and a sleeve 104 of silicone sponge rubber, or other high temperature resistant resilient material, is disposed within the heating tunnel above the rollers 20, close to the outfeed end 42, thereof. The roller 100 is mounted in a pair of bearings 106 which permit an adjustment of the spacing between the lower circumferential surface of the roller 100 and the upper circumferential surfaces of the underpassing rollers 20. The bearings are mounted to the exterior of the walls 74 and 76 respectively. Each bearing includes a housing 108 fixed to the wall, a journal carrier 110 disposed within the housing and free for up and down movement. A thumb screw 112 is threaded through the top of the outer casing 70 and a bushing 114 fixed thereto, passes through the housing 108 and is keyed by a snap ring to the journal carrier 110. Clockwise rotation of the thumb screw lowers the carrier, and counterclockwise rotation raises the carrier. A journal 116 is disposed within the housing and free for up and down movement. A spring 118 is disposed within the housing above the journal and biases the journal to the bottom of the carrier. The end of an axle 102 of the roller 100 passes through a vertically elongated slot 120 in the sidewall 74 and a vertically elongated slot 122 into the journal 116. Thus rotation of the thumb screws adjusts the height of the roller. However, the roller is able to rise upwardly against the bias of the springs 118.

The height of the roller 100 is adjusted so that it will yieldably engage and apply pressure to the upper surface of a package 124 which is being advanced through the heating tunnel by the rollers 20. The roller 100 is itself heated by the hot air in the tunnel. When the package 124 reaches the roller 100, its wrapper of heat shrinkable film is substantially shrunk to conform to the contours of the package. The heated roller 100 now applies pressure and heat to the engaged upper surface to further, locally, shrink the film, and effectively smoothens or irons out any wrinkles. Since the roller 100 engages and is rotated by the package as it passes thereunder, it rotates with the same surface speed as the package and does not slide with respect to the wrapper. Thus there is no tendency to rip the wrapper.

Figure 12:
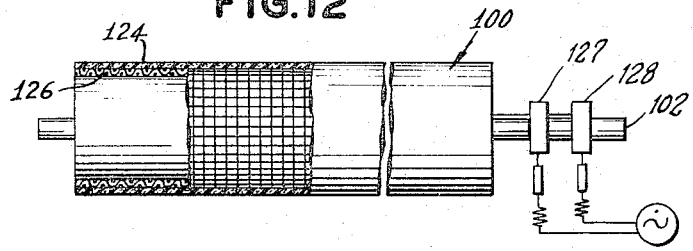
FIG. 12 is a detail view in elevation and partial cross-section of a smoothing roller.

As shown in FIG. 12, the roller 100 may alternatively be made with an outer layer of silicon sponge rubber 124 and an inner layer or grid of an electrical resistance material 126, connected by suitable slip-rings 127, 128 to a source of electrical power, both not shown. Such a roller is self-heating and can have its temperature made higher than the ambient temperature within the heating tunnel.

Figure 6:
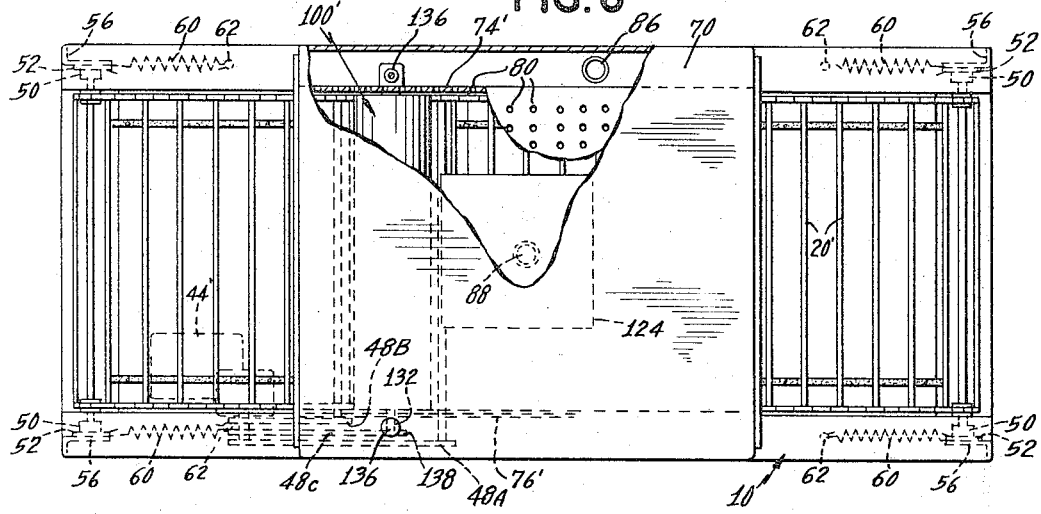
FIG. 6 is a view in plan and partial cross-section of the apparatus of FIG. 5.

The second embodiment which is shown on FIGS. 5 and 6 provides an upper roller 100' which is identical to the roller previously described and is identically journaled within the heating tunnel. The conveyor is divided into two independent portions 14A and 14B which are spaced apart below the roller 100'. Into this space, directly below and parallel to the roller 100' is disposed a second smoothing roller 130. This roller includes an axle 132 and a sleeve 134 of silicon sponge rubber. The ends of the axle are journaled in a pair of bearings 136 which are fixed to the walls 74' and 76' respectively. The top of the circumferential surface of roller 130 is made level with the tops of the rollers 20' of the conveyors 14A and 14B. A sprocket wheel 138 is fixed to the axle 132 and is coupled by a chain drive 48C to a sprocket wheel on a motor 44'. The motor also drives a chain drive 48A which is coupled to the conveyor 14A and a chain drive 48B which is coupled to the conveyor 14B.

The roller 130 is disposed within the flow of heated air from the hot air outlet 86 and is heated thereby. Alternatively, the roller 130 may be electrically heated in the same manner as the roller shown in FIG. 12. The upper roller 100' is adjusted in the bearings for height so that when a package passes from the conveyor 14A and between the rollers 100' and 130, the partially shrunk film on the upper surface of the package is pressed and heated by the upper roller while the partially shrunk film on the lower surface of the package is pressed and heated by the lower roller. The upper roller is rotated by the package and therefore has the same surface speed as the wrapper thereon. The drive to the lower roller is controlled so that it also has the same surface speed as the package, thereby avoiding the possibility of tearing the wrapper.

The apparatus shown in FIGS. 7 through 10 serves to smoothen the edges of a package after the upper and lower surfaces of the package have been smoothened. This apparatus may advantageously be connected to the lefthand end of the apparatus shown in FIG. 5.

The edge smoothing apparatus includes two sidewalls 202 and 204 which support therebetween a plurality of spaced apart cross-bars 206 and axles 208 and 210. The axles 208 and 210 have sprocket wheels 214 fixed thereto which support a conveyor 14D, consisting of two endless sprocket chains and coupled therebetween rollers. The cross-bars 206 support two longitudinal friction bars 216 which engage the upper run of rollers. The conveyor 14D is thus similar to the previously described conveyor 14. The axle 208 has a sprocket wheel fixed thereto which is coupled by a sprocket chain 48D to the motor 44'. A plurality of brackets 218 support two guide rails 220A and 220B between the conveyor and the sidewall 204. A plurality of brackets 222 support a guide rail having three portions 224A, 224M and 224B between the conveyor and the sidewall 202. The rails 220A and 224A are spaced apart by a distance equal to the width of the package. The guide rails 20B and 224B are spaced apart by a distance equal to the length of the package, shown in FIG. 7 to be equal. The rails 220A and 220B are in line and coplanar. The rail portion 224M is a transition between the portions 224A and 224B and is bowed outwardly along a radius equal to the diagonal of the package.

There is a gap between the adjacent ends of the guide rails 220A and 220B and a bracket 226 is fixed to the sidewall 204 and extends therebetween. A hingepin 228 is uprightly fixed to the bracket 226. A gate has an upright tube 230 journaled on the hingepin and two mutually perpendicular arms 232 and 234 extending therefrom. A spring 236 is disposed on the hingepin, and biases the gate counterclockwise as seen in FIGS. 7 and 9 so that the arm 232 abuts a stop 238 and is aligned with the guide rail 220A while the arm 234 extends as a barrier across and above the conveyor 14D. As a package is advanced by the conveyor 14D with its width between the guide rails 220A and 224A, its leading edge abuts the arm 234, swinging the gate clockwise. The arm 232 also swings clockwise, pivoting the package about the hingepin 90°. The package is now advanced by the conveyor 14D with its length between the guide rails 220B and 224B. After the package leaves the gate, the spring restores the gate counterclockwise.

A first pair of vertical rollers 330 extend respectively through apertures in the guide rails 220A and 224A. Each roller has a silicone rubber sleeve 332, over an electrical heating grid, similar to the grid 126 of the roller 100, on a vertical axle 334, which is mounted in a U-shaped bracket 336. Each bracket 336 is slidedly mounted for horizontal movement in a bracket 338 fixed to the sidewalls 202 and 204, respectively, and is adjusted by a thumbscrew 340. The spacing of the rollers is adjusted so that the peripheral surfaces extend through the apertures on the guide rails to engage the edges of the package passing therebetween. The rollers are rotated by the passing package and therefore have the same surface speed as the wrapper thereon.

A second pair of similarly heated rollers 242 are similarly mounted for action through apertures in the guide rails 220B and 224B to engage the other set of edges of the package after the package has been rotated 90° by the gate.

While we have shown and described the presently preferred embodiment of my invention, it will be understood that the invention may be embodied otherwise than as herein specifically illustrated or described and is not to be limited to the herein described specific construction, except as may be required by the scope of the appended claims considered with reference to the prior art.

What is claimed is:

1. Apparatus for heat-shrinking heat-shrinkable film wrappers on individual packages comprising: a heating chamber for heating film-wrapped packages; conveyor means for conveying a wrapped package through said heating chamber; a heated, resiliently surfaced roller disposed within said heating chamber for engaging and applying heat and pressure progressively and substantially uniformly to the film on a surface of the wrapped package as it is conveyed within said chamber, the package driving said roller whereby the surface speeds of said roller and the package are identical.

2. Apparatus for heat-shrinking heat-shrinkable film wrappers on individual packages, comprising: heat applying means for initially shrinking the film wrapped about a package; two heated, resiliently surfaced rollers spaced apart for receiving therebetween a wrapped package for subsequently engaging and applying heat and pressure to the film progressively and substantially uniformly on two opposite sides of the wrapped package, the package driving said rollers, whereby the surface speeds of said rollers and the package are identical.

3. Apparatus for heat-shrinking heat-shrinkable film wrappers on individual, rectangular solid packages, comprising: heat applying means for initially shrinking the film wrapped about a package; three pairs of heated, resiliently surfaced rollers, each pair spaced apart for receiving therebetween a wrapped package for subsequently applying heat and pressure to the film on a respective pair of opposite sides of the wrapped package, the surface speeds of said rollers and the package being identical.

4. Apparatus for heat-shrinking heat-shrinkable film wrappers on individual packages comprising: an elongated heating tunnel; means coupled to said tunnel for providing hot air thereto; conveyor means for conveying a wrapped package through said tunnel along a predetermined path; a heated, resiliently surfaced roller disposed above a later portion of the path of the package for engaging the film on the upper surface of the package progressively and substantially uniformly applying heat and pressure to this film, the surface speed of said roller and the package while it is engaged by the roller being identical.

5. Apparatus for heat-shrinking heat-shrinkable film wrappers on individual packages, comprising: an elongated heating tunnel; means coupled to said tunnel for providing hot air thereto; conveyor means for conveying a wrapped package through said tunnel along a predetermined path; a pair of heated, resiliently surfaced rollers disposed respectively above and below a later portion of the path of the package for respectively engaging the film on the upper and lower surfaces of the package for progressively and substantially uniformly applying heat and pressure to this film, the surface speeds of said rollers and the package while it is engaged by the rollers being identical.

6. A method of heat-shrinking heat-shrinkable film wrappers on individual packages comprising: initially heating the entire film wrapped about a package to shrink the film substantially to conform to the package; subsequently engaging and applying heat and pressure progressively and substantially uniformly to a surface of the film, said pressure being applied substantially solely perpendicularly to such surface of the film by a roller which is driven at a common surface speed by the package.

References Cited

UNITED STATES PATENTS

| | | | |
|---|---|---|---|
| 2,785,519 | 3/1957 | Rumsey | 53—184 |
| 3,156,812 | 11/1964 | Formanetal | 53—30 X |
| 3,166,462 | 1/1965 | Schoder | 53—39 X |
| 3,222,800 | 12/1965 | Siegel et al. | 52—184 X |

GRANVILLE Y. CUSTER, JR., *Primary Examiner.*